United States Patent [19]

Ackeret

[11] 4,415,079
[45] Nov. 15, 1983

[54] HOLDER FOR PHOTOGRAPHIC PRINTS

[75] Inventor: Peter Ackeret, Küsnacht, Switzerland

[73] Assignee: Licinvest AG, Chur, Switzerland

[21] Appl. No.: 357,763

[22] Filed: Mar. 12, 1982

[30] Foreign Application Priority Data

Mar. 16, 1981 [DE] Fed. Rep. of Germany ....... 3110058

[51] Int. Cl.³ .............................................. B65D 25/00
[52] U.S. Cl. ..................... 206/45.34; 206/425;
206/454; 206/455; 206/555; 206/556; 312/15;
312/319
[58] Field of Search ............... 206/45.34, 387, 425,
206/449, 454, 455, 494, 554, 555, 556; 312/15,
18, 319

[56] References Cited

U.S. PATENT DOCUMENTS

| 1,821,350 | 9/1931 | Levy | 206/555 |
|---|---|---|---|
| 1,842,442 | 1/1932 | Ames | 206/449 |
| 2,609,219 | 9/1952 | Marano | 206/556 |
| 2,638,211 | 5/1953 | Spurr | 206/449 |
| 3,069,215 | 12/1962 | Dodge | 312/119 |
| 3,796,302 | 3/1974 | Warren | 206/555 |
| 3,904,259 | 9/1975 | Hoffmann et al. | 206/387 |
| 3,955,092 | 5/1976 | Hubert | 206/455 |
| 3,995,921 | 12/1976 | Ackeret | 206/387 |
| 4,046,255 | 9/1977 | Ackeret | 312/319 |
| 4,295,565 | 10/1981 | Takeuchi | 206/455 |

FOREIGN PATENT DOCUMENTS

| 2311379 | 10/1976 | France | 206/387 |
|---|---|---|---|
| 941 | 12/1886 | Switzerland | 206/556 |

Primary Examiner—Joseph Man-Fu Moy
Assistant Examiner—David Fidei

[57] ABSTRACT

A holder for accommodating a variable number of photographic prints comprises a housing having a viewing window against which the uppermost print is resiliently biased. The holder includes a slide which may be partially withdrawn therefrom to gain access to the prints, the resilient bias being suppressed during withdrawal of the slide.

17 Claims, 17 Drawing Figures

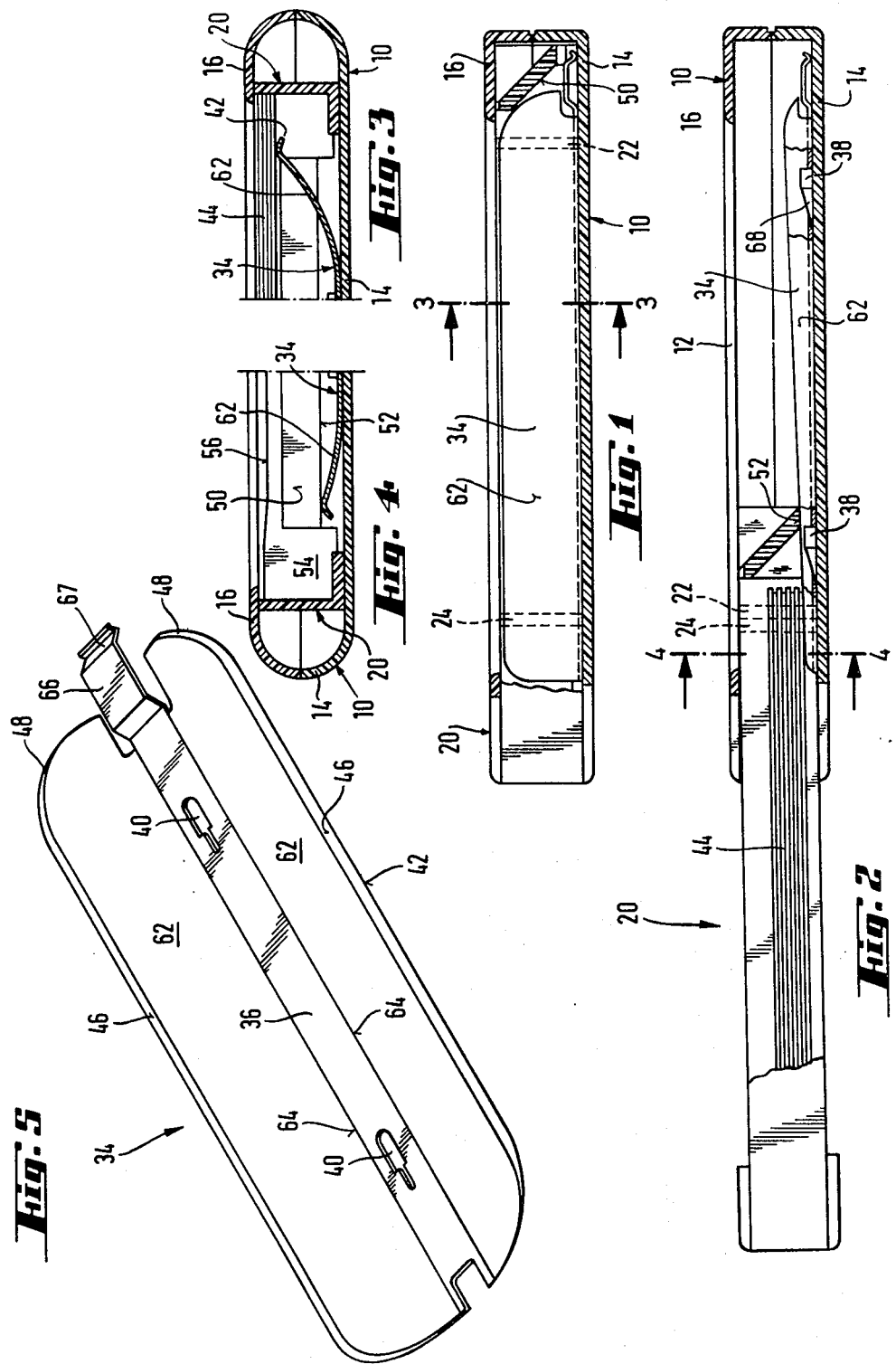

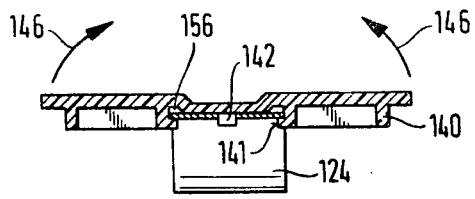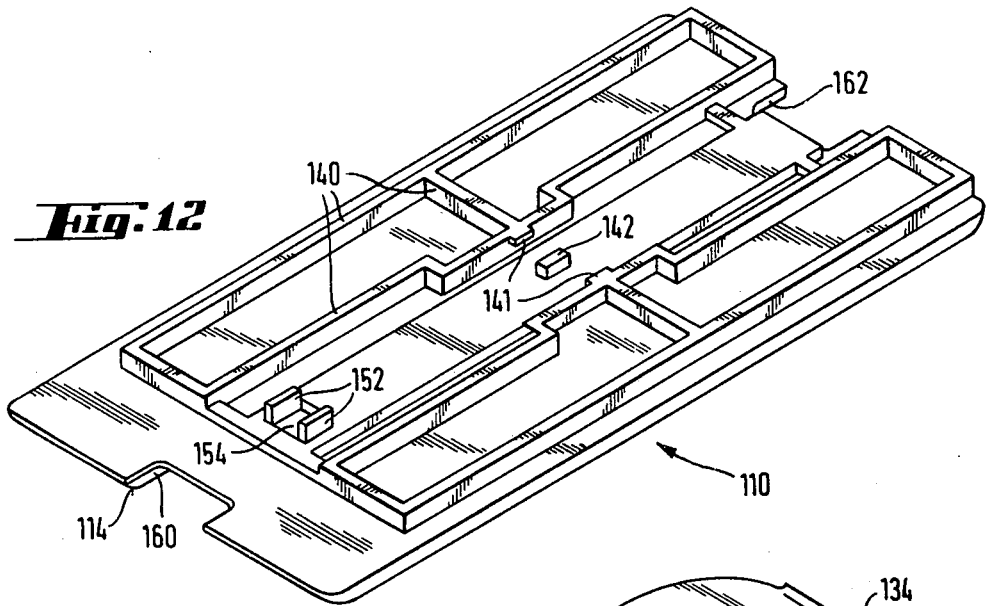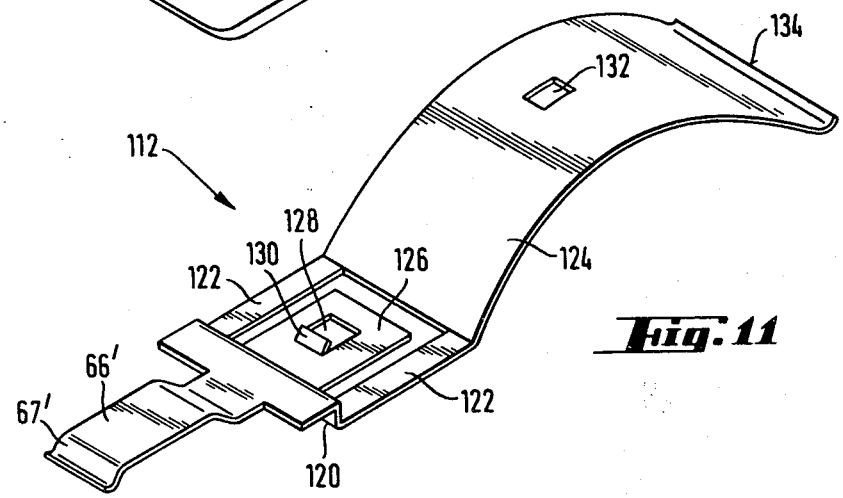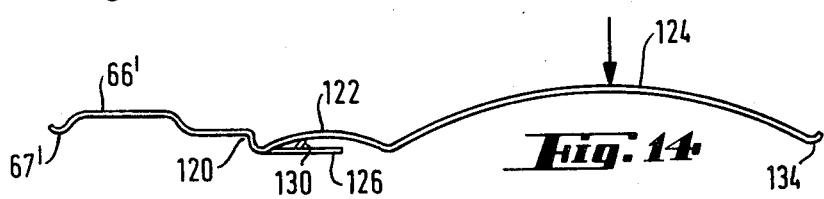

HOLDER FOR PHOTOGRAPHIC PRINTS

BACKGROUND OF THE INVENTION (1) Field of the Invention

The present invention relates to the storage of photographs and particularly to retaining a temporarily stored photograph in parallel relationship to a window through which it may be viewed. More specifically, this invention is directed to holders for accommodating a variable number of photographic prints and especially to a photographic print holder having a slidable print carrier and means for biasing the prints against a viewing window. Accordingly, the general objects of the present invention are to provide novel and improved methods and articles of such character.

(2) Description of the Prior Art

Holders for the temporary or semi-permanent storage of photographic prints are well known in the art. An exemplary prior art photograph holder may be seen from published German patent application Ser. No. 27 42 347.8.

A photograph print holder must provide protection to the print or prints housed therein and should also cause the uppermost print to be held in a parallel relationship to a viewing window. Additionally, the holder must be provided with some form of carrier, for example a slide mechanism, whereby the photographs may be loaded into the holder and removed therefrom. The movements of the carrier must be accomplished without damaging the prints. In the past the requirements of flat storage and safe easy withdrawal have been generally inconsistent, i.e., one could not be achieved with total success without having a deleterious effort on the other.

SUMMARY OF THE INVENTION

The present invention overcomes the above-discussed and other dificiencies and disadvantages of the prior art by providing a novel and improved holder for photographic prints. A holder in accordance with the present invention will accommodate a variable number of prints and comprises a housing for a transport or carrier, the housing being provided with a viewing window. Prints which have been loaded into the carrier are pressed, by means of a biasing spring subassembly, against the window. Upon withdrawal of the carrier, for the purpose of loading or changing prints, the biasing action of the spring subassembly is suppressed. The spring subassembly is mounted within the housing and, in one embodiment, has plural contact regions which extend parallel to the direction of movement of the carrier. These contact regions, with the carrier inserted, contact the lowermost photographic print. In a second embodiment the spring subassembly includes a movable plate which contacts the lowermost print, the plate thus defining a contact region. As the carrier is withdrawn a control bar thereon will enter into contact with the spring subassembly contact region or regions to thereby suppress the biasing action and thus permitting movement of the prints without danger of damage thereto.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a schematic cross-sectional, side elevation view of a holder in accordance with a first embodiment of the present invention;

FIG. 2 is a schematic view similar to FIG. 1 showing the holder with the slide withdrawn and prints inserted therein;

FIG. 3 is a schematic partial cross-sectional view, taken in a direction transverse to that of FIGS. 1 and 2, depicting the holder with prints inserted therein;

FIG. 4 is a schematic view similar to FIG. 2 with the slide and prints withdrawn;

FIG. 5 is a perspective view, on an enlarged scale, of the biasing spring of the embodiment of FIGS. 1-4;

FIG. 11 is a perspective view of a spring element of the spring subassembly of the embodiment of FIGS. 9 and 10;

FIG. 12 is a perspective bottom view of a biasing plate of the spring subassembly of the embodiment of FIGS. 9 and 10;

FIG. 13 is a cross-sectional front elevation view of the assembled spring subassembly of the embodiment of FIGS. 9 and 10;

FIG. 14 is a schematic side elevation view of the spring depicted in FIG. 11;

DESCRIPTION OF THE DISCLOSED EMBODIMENTS

Figure 6:
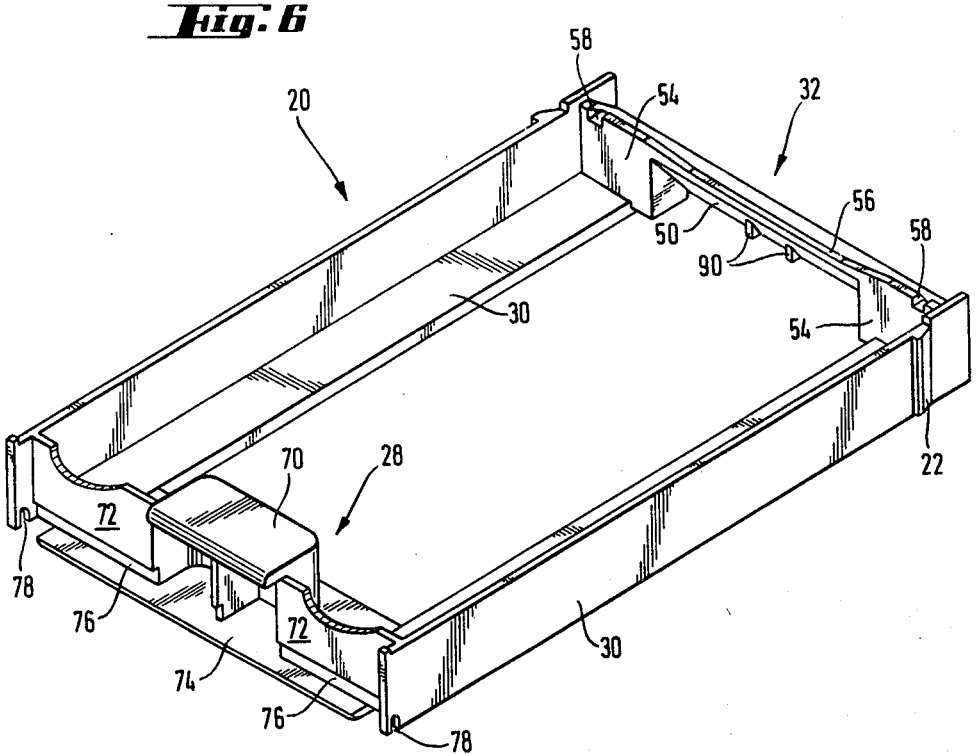
FIG. 6 is a perspective view, on an enlarged scale, of the slide of the embodiment of FIGS. 1-4.

With reference simultaneously to FIGS. 1 through 8, a first embodiment of the holder for photographic prints in accordance with the present invention is shown. The holder includes a housing, indicated generally at 10, which is provided with a viewing window 12 in a first side thereof. The housing 10 is generally of rectangular shape when viewed from the top and sides thereof. However, as may be seen from FIGS. 3, 4 and 8, the housing is preferably provided with a pair of oppositely disposed, rounded sides and thus, from the front and rear sides thereof, has a generally flattened oval shape. As may be seen from FIG. 8, the housing 10 is comprised of a lower shell 14 and upper shell 16. A viewing window defining member 18 is mounted in upper shell 16. The viewing window will be fabricated from a transparent plastic material while the remainder of the housing, and the slide or print carrier 20 which is received, therein will typically be comprised of a colored or opaque plastic material. As will be described further below, the upper and lower shells 14 and 16 and the window subassembly 18 fit together in an interlocking manner and will be adhesively or thermally bonded together to form an integral subassembly.

With the exception of an opening in the front end for withdrawing the slide 20, the housing 10 will be a closed, hollow subassembly. The slide, which is indicated generally at 20 in FIG. 2, is provided with stops in the form of shoulders 22 (FIG. 1) which cooperate with stops 24 which are integral with the housing. The cooperating stops 22 and 24 prevent separation of the slide from the housing. In the assembly of the holder, a spring subassembly, which will be described below, is attached to the floor 26 of lower shell 14, the slide 20 is then placed in the lower shell and the subassembly comprising the upper shell and viewing window is then mated with the lower shell. Finally, the upper and lower shells are bonded together to provide a holder having a housing with a slide which is movable therein but which can not be fully withdrawn therefrom.

Referring to FIG. 6, the slide 20 is generally in the form of an open frame having a front end portion, indicated generally at 28, a pair of L-shaped side rails 30 and a rear end portion, indicated at 32, which defines a control bar.

Figure 16:
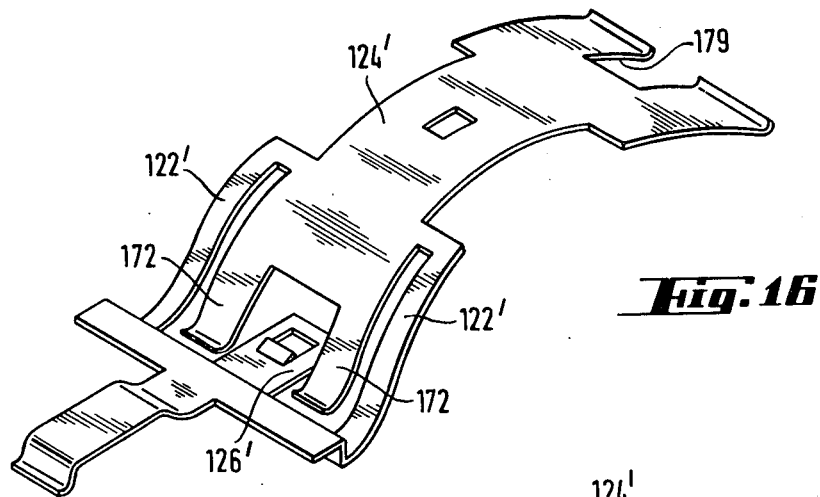
FIG. 16 is a perspective view, similar to FIG. 11, of a further spring element in accordance with the present invention.
Figure 17:
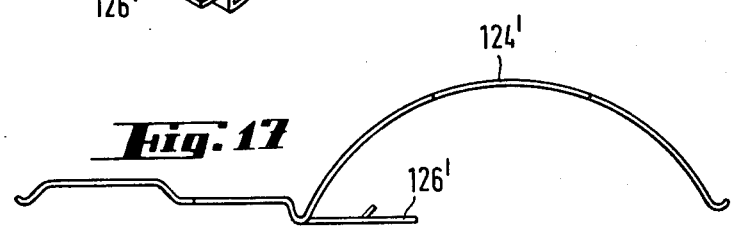
FIG. 17 is a view similar to FIG. 14 depicting the spring element of FIG. 16.

The spring subassembly as depicted in FIG. 5, may be in the form of a one-piece part, typically fabricated from sheet metal, which has been indicated generally at 34. This spring may, however, take other forms including a coil and those forms to be described below in the discussion of FIGS. 11 and 16. In the embodiment of FIG. 5 the spring 34 has an approximately trough-shaped cross-section when viewed in a direction perpendicular to the direction of movement of the slide 20. However, a spring configuration which is substantially V- or U-shaped in cross-section could be employed.

The base or floor portion 36 of spring 34 will lie flat on the floor 26 of lower shell 14. The lower shell will be provided with integrally molded lugs 38, shown in FIG. 2, which project through openings 40 in portion 36 of spring 34. There are obviously numerous alternative techniques for mounting the spring to the lower shell which include various bonding and mechanical capture techniques.

Referring simultaneously to FIGS. 3-5, it may be seen that the side portions or wings 62 of spring 34 are bent over to provide a pair of parallel, smooth, rounded contact regions 46 disposed inwardly from side edges 42. As shown schematically in FIG. 3, with prints installed in the holder, these rounded contact regions 46 rest against the back of the lowermost of the prints 44. The length of the contact regions 46 of spring 34 corresponds substantially to the dimensions of the viewing window 12 in the direction of movement of slide 20. It has been found that the exertion of pressure against the prints along the two lines defined by contact regions 46 of spring 34 is sufficient to press even badly deformed (curved) photographic prints flat against the inside of the viewing window.

The contact regions 46 of spring 34 extend parallel to viewing window 12 and, at the oppositely disposed ends thereof, curve inwardly to join the end edges of the spring by means of rounded shoulders 48. The shoulders 48, which are positioned oppositely with respect to the opening in the housing through which the slide moves, define run-up or lead-in sections for the control bar of end portion 32 of the slide. Referring again to FIG. 1, the control bar defining end 32 of slide 20 has an oblique surface 50 which, when the slide is pulled in the outward direction, runs up on to rounded shoulders 48 of spring 34 and, in so doing, presses the contact regions 46 of spring 34 downwardly toward floor 26 of the housing. As withdrawal of the slide continues, the lower edge 52 of surface 50 will slide along spring contact regions 46 thus depressing the spring to the position represented in FIG. 4. FIG. 4 may be contrasted to FIG. 3 which represents the condition of the spring when the slide 20 is fully inserted in the housing.

A stop surface 54 is defined at each side of the oblique cam surface 50 of end 32 of slide 20. The stop surfaces 54 are arranged transversely with respect to the direction of movement of the slide and thus are also transverse to the surface of photographic prints which may be carried by the slide. Thus, as movement imparted to slide 20 the surfaces 54 will contact side edges of the prints and cause the prints to move safely and securely with the slide. The end 32 of slide 20 is also provided with a shallow cut-out 56 which insures that there will be no contact between end 32 and the inwardly facing surface of window 12 during movement of the slide. Notches 58 are provided in end 32 of slide 20 and cooperate with parallel guide rails 60 which extend downwardly from the window member 18 to prevent the uppermost inserted photographic print from jamming in the widening gap between the viewing window, or the frame around it, and the upper edge of end 32 as the slide is withdrawn. Thus, in operation, the guide rails 60 engage the notches 58 and keep the edges of the photographic prints which abut surfaces 54 below the level of the upper edge of end 32 of slide 20.

The curved "wings" 62 of spring 34 which extend between the floor or base portion 36 and the contact regions 46 are, as a function of the number of prints inserted in the holder, bent outwardly about the bend lines 64. During withdrawal of the slide 20 the control bar end 32, specifically the camming surface 50 thereon, will contact the rounded shoulders 48 after a degree of movement commensurate with the number of prints 44 which are present in the holder. In order to avoid any sudden movement which would otherwise occur, spring 34 is provided, in the form of an extension of the floor portion 36, with a braking tongue 66. Tongue 66 is normally in contact with the control bar end 32 in the region between a pair of projections 90 (FIG. 6). This cooperation between the tongue 66 and the end of the slide biases the spring and thus subjects the slide to a substantially uniform frictional braking action. Because of this biasing, the user will not be likely to detect the initial contact between surface 50 on slide 20 and shoulders 48 on spring 34. The braking tongue 66 is angled downwardly in the direction of the floor 26 of the housing at its free end. When the slide is fully inserted a downwardly angled cam portion 67 of tongue 66 is positioned adjacent the projections 90 on the slide and serves to maintain the slide in the fully inserted position. The oblique angling of the cam portion 67 of tongue 66 of spring 34 also provides compensation for manufacturing tolerances.

Referring again to FIG. 2, the lugs 38 which extend upwardly from floor 26 are provided with tapered front edges 68 which extend through the mounting openings 40 in spring 34. The tapered surfaces 68 ensure that the bottom-most photograph of a stack of photographs inserted in slide 20 will not catch on or damaged by the lugs 38 or the edges of the mounting openings 40 even in the case where the lowermost photograph is curved in the downward direction about a longitudinal axis.

Figure 7:
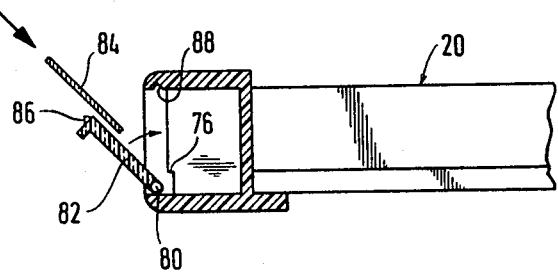
FIG. 7 is a partial cross-sectional side elevation view of a slide of FIG. 6.

The front end 28 of slide 20 includes a grip portion 70 which has a flat inwardly facing side edge against which the edges of the prints may rest. This grip portion 70 is connected to the side rails 30 by means of wall portions 72. Wall portions 72 are set back slightly with respect to the ends of side rails 30, the most forward end of grip 70 and floor defining member 74 which interconnects rails 30 at the forward end of the slide. The walls 72 are provided with inwardly projecting steps 76 which defining downwardly facing shoulders. Cut-outs 78 are formed in the lower edges of the side rails 30 at a point forward of the junction of walls 72 and rails 30. Referring to FIG. 7, the cut-outs 78 receive pivot axis defining stubs 80 of a label window 82 which is preferably formed from a transparent plastic material. A label 84 may be removably inserted behind the window 82 by pivoting the window about stubs 80 to the position shown. The window 82 may be locked in the closed position by means of cooperation between a projection 86 on the top thereof and a mating recess 88 which will be formed on the underside of the grip 70.

The above-described holder has been found to perform satisfactory and to overcome the deficiencies of the prior art. It is, however, comparatively expensive to manufacture and it may be considered a disadvantage to have the empty slide seen through the viewing window. Both of these disadvantages are avoided in the holder shown in FIGS. 9-17 which has a slide of identical construction to that described above and shown in FIG. 6.

Figure 8:
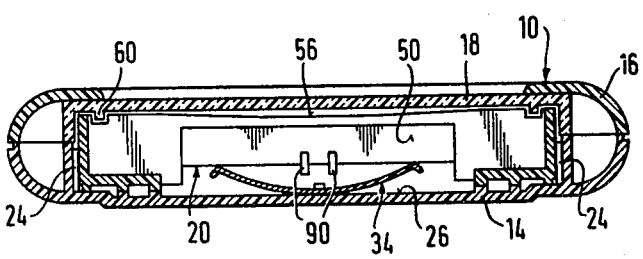
FIG. 8 is a view similar to FIG. 4 which illustrates the constructional details of the first embodiment of the present invention.
Figure 9:
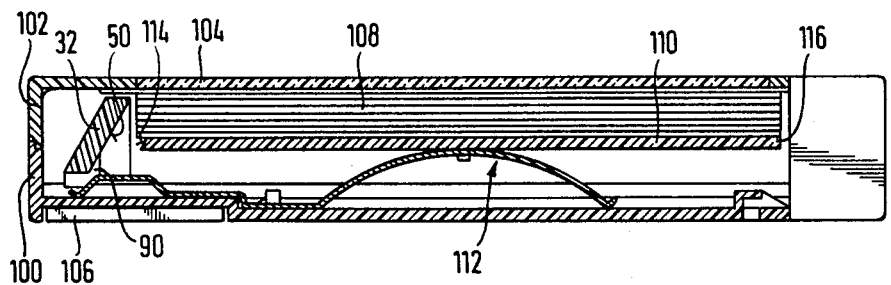
FIG. 9 is a view similar to FIG. 1 depicting a holder in accordance with a second embodiment of the invention with prints inserted therein.
Figure 10:
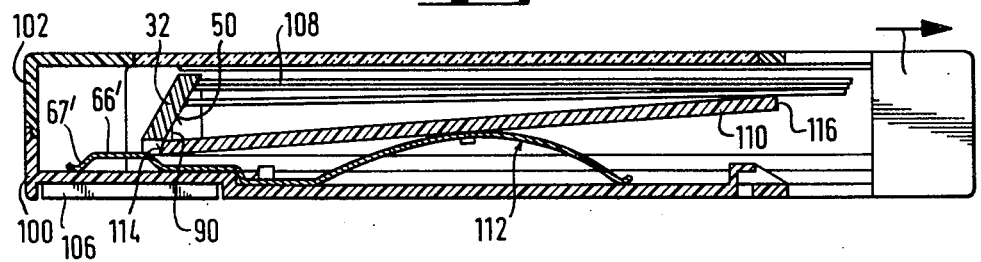
FIG. 10 is a view of the holder of FIG. 9 with the slide partly withdrawn.

In the holder of FIGS. 9-17 the spring subassembly is comprised of two components, i.e., a one-piece spring formed from flat material and a cover plate which is injection molded from a suitable plastic. The cover plate is attached to the spring on the side thereof which faces the viewing window. The housing of the embodiment of FIGS. 9-17 differs from the housing described above only insofar as modifications are required for the mounting of the spring subassembly. Thus, referring to FIGS. 9 and 10, the housing has a lower shell 100, an upper shell 102 and a viewing window defining member 104. If deemed desirable, the lower shell can be provided with a foot or support portion, which defines the floor 26, on its underside as shown in FIG. 8. In FIGS. 9 and 10 a stack of photographs 108 is shown inserted in the holder and it may be seen that the uppermost photograph is pressed against the inside of viewing window 104 by cover plate 110, plate 110 being biased in the upward direction by means of spring 112. The locking of the slide in the housing by the cooperation of projections 90 with a braking tongue 66' having a camming portion 67' (FIG. 11) is the same as described above with respect to the embodiment of FIGS. 1-8.

Upon withdrawal of the slide, its oblique camming surface 50 will contact and slide onto an opposing oblique surface 114 on cover plate 110 so that a gentle transition will be achieved dispite unavoidable manufacturing tolerances. The slide will, as in the above described embodiment, be subjected to a substantially uniform frictional braking action due to the action of the slide in pressing the cover plate away from the viewing window against the force of the spring. When the slide is in the fully withdrawn position the forwardly disposed end 116 of the cover plate is still under the control bar defining end 32 of the slide and thus the slide may be easily returned to its full inserted position in the housing.

The construction of a spring 112 for cooperation with the plate 110 of FIG. 12 may be seen from FIGS. 11 and 14. In FIG. 11 the spring is shown in perspective in the relaxed position while FIG. 14 schematically shows the spring, in a side elevation view, in the downwardly-pressed position.

Spring 112 is cut to length from a spring band stock material, punched and bent into shape. The spring includes, in addition to the braking tongue 66' and its associated cam surface 67', a right angled portion 120 which is necessitated by a corresponding depression in the lower shell of the housing in the region of the foot area (FIG. 8). Spring 112 also includes a pair of connecting bars 122 which join portion 120 to the actual bowed spring element 124. A fastening flap 126 extends from portion 120 into the space between bars 122 and is provided with an opening 128 and a barb 130. The bowed portion 124 of spring 112 is provided, intermediate the ends of the arc defined thereby, with a mounting hole 132. The free end of bowed portion 124 is bent slightly backwards, as indicated at 134, so that this free end may slide with low friction on the floor of the housing as the degree of compression of the spring varies.

FIG. 12 depicts the cover plate 110 from below, i.e., from the side which faces spring 112. Plate 110 is, as noted above, fabricated as a one-piece injection-molded plastic part. The upper side of plate 110, i.e., the side which contacts the back of the lowermost photograph in the holder, is flat. Plate 110 is provided on its underside with reinforcing ribs 140 and means for mounting the plate to the spring.

The aforementioned means for joining the plate and spring as a pre-assembled unit includes a centering peg 142 which is positioned and shaped so as to engage the mounting hole 132 in the bowed portion of the spring. Additionally, a pair of laterally extending lugs 141 are formed on ribs 140 in alignment with peg 142, the spring fitting under the lugs 141. In order to assembly the plate and spring, as representing in FIG. 13, the plate is flexed in the direction indicated by arrows 146. The preformed spring assembly is attached to the housing, specifically the floor 150 of the lower shell 100, through the use of fastening hole 128 in flap 126. This fastening hole is engaged by a projection 148 which is integral with shell 100 and pressure is then exerted on the cover plate above hole 128. The cover plate further includes a pair of force transmitting projections 152 formed at each side of an opening 154. The downward pressure on the cover plate causes the projections 152 to contact the flap 126 at either side of fastening hole 128. This causes the projection 148 on the lower shell to be forced through fastening hole 128. As the projection passes through hole 128 the barb 130 will be slightly displaced and the edge thereof will firmly engage the projection 148. The projection 148 can be made long enough to pass through the opening 154 so as to be flush with the surface of plate 110 which faces the viewing window when the cover plate is in its lowest position, i.e., when the ribs 140 are in contact with the floor of the lower shell. It is to be noted that the above-described assembly technique can be automated.

Referring again to FIG. 13, the upper side of the cover plate 110 is additionally provided with a longitudinally extending channel 156 which defines the path for free movement of the projections 90 of the slide (see FIG. 6).

Figure 15:
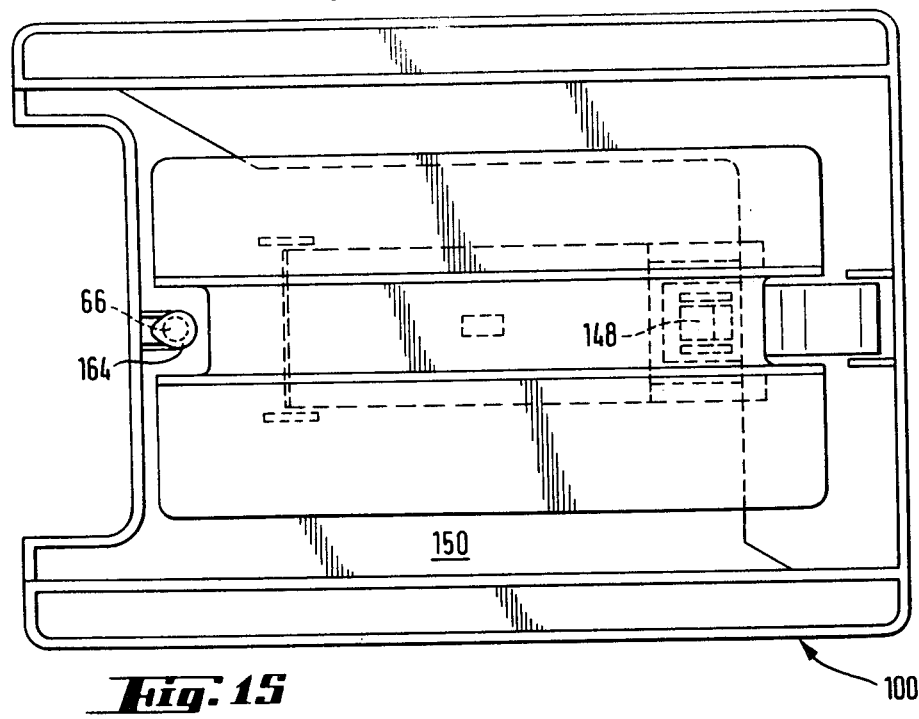
FIG. 15 is a plan view of the lower housing portion of the holder of FIGS. 9 and 10 with the spring subassembly mounted therein.

FIG. 12 also shows plate 110 as being provided with a pair of oppositely disposed cut-outs 160 and 162. The inner cut-out 160 provides space for the braking tongues 66' of the spring. The outer cut-out 162 provides space for a cap 164 which is also provided on the floor 150 of lower shell 100 (FIG. 15). The cap 164 limits passage toward the inside of the holder of a hook or nail which may be used to hang the holder, by means of a hole 166, when it is desired to employ the holder as a hanging frame. Thus, the cap 164 over hole 166 prevents the hook or nail from damaging the photographic print which faces it while permitting the control bar end 32 of the slide to pass. The provision of the ability to employ the holder as a hanging frame, and thus the presence of hole 166 and cap 164, dictates the spacing of the projections 90 on end 32 of slide 20.

The embodiment of the present invention depicted in FIGS. 6 and 9–15 is intended to accommodate prints having a relatively large size. When the holder is to be used with smaller prints, for example prints having 9 cm×9 cm format, it may be advantageous to replace the spring of FIGS. 11 and 14 by the modified spring shown in FIGS. 16 and 17. The spring of FIGS. 16 and 17 will project into the region of the cap 164 and is therefor provided with a cut-out 170. Additionally, the connecting bars 122' form part of the spring bow 124' which, additionally, is supported on the floor of the housing by a pair arms 172. The material originally in the space between the arms 172 is employed to fabricated the fastening flap 126'. It will be understood by those skilled in the art that, if smaller prints are to be accommodated and the spring of FIGS. 16 and 17 employed, the cover plate, slide and housing will all be reduced in size so as to be commensurate with the size of the prints.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A holder for accommodating a variable number of photographic prints comprising:
    housing means, said housing means having a planar viewing window in first side thereof, said housing means having a hollow structure;
    slide means for supporting a plurality of prints, said slide means being at least in part positioned within said housing means and being movable relative thereto, said slide means defining a control bar at a first end thereof, said slide means having an opening in registration with prints carried thereby; and
    spring means positioned within and fastened to an interior surface of said housing means, said spring means including at least a first contact region which extends in the direction of movement of said slide means, said contact region extending through the opening in said slide means when said slide means is fully inserted in said housing means and contacting the lowermost print to urge the print against the inwardly facing surface of said housing means window, said slide means control bar cooperating with said spring means to cause movement of the contact region thereof away from the viewing window upon movement of said slide means from the fully inserted position toward the withdrawn position.

2. The apparatus of claim 1 wherein said slide means control bar extends transversely with respect to the direction of movement of said slide means and forms the inner rear wall thereof.

3. The article of claim 1 or 2 wherein said spring means comprises a resilient member of one-piece construction.

4. The apparatus of claim 3 wherein said spring means has at least one bend line, extending parallel to the direction of movement of said slide means, said bend line being positioned adjacent the said interior surface of said housing means to which said spring means is affixed.

5. The apparatus of claim 4 wherein said spring means has a generally trough-shaped cross-section and the free edges of said spring means define a pair of parallel print contact regions.

6. The apparatus of claim 4 wherein said spring means contact region includes a curved extension which leads said slide means control bar into a compressive relationship with said spring means.

7. The apparatus of claim 2 wherein said slide means control bar extends substantially over the width of interior of said housing means in a direction transverse to the direction of movement of said slide means and wherein said control bar is spaced from the interior surface of said viewing window.

8. The apparatus of claim 7 wherein said housing means is further provided with guide rails and wherein said slide means control bar is provided with guide grooves which are engaged by said guide rails.

9. The apparatus of claim 2 wherein said spring means further comprises a locking cam, said locking cam engaging said slide means control bar to retain said slide means in the fully inserted position.

10. The apparatus of claim 6 wherein said spring means further comprises a locking cam, said locking cam engaging said slide means control bar to retain said slide means in the fully inserted position.

11. The apparatus of claim 10 wherein said spring means further comprises a braking tongue, said braking tongue cooperating with said slide means control bar to provide a transition between the slide means locked position and spring means compression position.

12. The apparatus of claim 5 wherein said spring is affixed to the housing by means of a planar portion and wherein said housing means is provided with sloped projections which extend through said spring means planar portion.

13. The apparatus of claim 1 wherein said spring means comprises:
    a spring member;
    a cover plate, said cover plate being affixed to said spring member and having a planar surface which faces said viewing window; and
    means attaching said spring member to said housing means.

14. The apparatus of claim 13 wherein said spring means is mechanically captured on said cover plate.

15. The apparatus of claim 14 wherein said slide means control bar extends transversely with respect to the direction of movement of said slide means and forms the inner rear wall thereof.

16. The apparatus of claim 15 wherein said housing means is further provided with guide rails and wherein said slide means control bar is provided with guide grooves which are engaged by said guide rails.

17. The apparatus of claim 16 wherein said spring member furthe comprises a locking cam, said locking cam engaging said slide means control bar to retain said slide means in the fully inserted position.

* * * * *